(12) United States Patent
Telfer et al.

(10) Patent No.: US 11,846,863 B2
(45) Date of Patent: Dec. 19, 2023

(54) COORDINATED TOP ELECTRODE—DRIVE ELECTRODE VOLTAGES FOR SWITCHING OPTICAL STATE OF ELECTROPHORETIC DISPLAYS USING POSITIVE AND NEGATIVE VOLTAGES OF DIFFERENT MAGNITUDES

(71) Applicant: E INK CORPORATION, Billerica, MA (US)

(72) Inventors: Stephen J. Telfer, Arlington, MA (US); Crystal Nguyen, Bedford, MA (US); Amit Deliwala, Andover, MA (US); Kosta Ladavac, Somerville, MA (US); Christopher L. Hoogeboom, Burlington, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 17/943,313

(22) Filed: Sep. 13, 2022

(65) Prior Publication Data
US 2023/0004061 A1   Jan. 5, 2023

Related U.S. Application Data

(63) Continuation-in-part of application No. 17/474,375, filed on Sep. 14, 2021.
(Continued)

(51) Int. Cl.
*G02F 1/1685*   (2019.01)
*G02F 1/167*   (2019.01)

(52) U.S. Cl.
CPC ............ *G02F 1/1685* (2019.01); *G02F 1/167* (2013.01)

(58) Field of Classification Search
CPC ..................................... G02F 1/1685
See application file for complete search history.

(56) References Cited

U.S. PATENT DOCUMENTS

| 4,418,346 A | 11/1983 | Batchelder |
| 5,852,196 A | 12/1998 | Hou |

(Continued)

FOREIGN PATENT DOCUMENTS

| CN | 102831850 A | 12/2012 |
| JP | 2010044114 A | 2/2010 |

(Continued)

OTHER PUBLICATIONS

European Patent Office, "International Search Report and Written Opinion", PCT/US2022/043292, dated Dec. 23, 2022.
(Continued)

*Primary Examiner* — Gustavo Polo
(74) *Attorney, Agent, or Firm* — Brian D. Bean

(57) ABSTRACT

A system for simplified driving of electrophoretic media using a positive and a negative voltage source, where the voltage sources have different magnitudes, and a controller that cycles the top electrode between the two voltage sources and ground while coordinating driving at least two drive electrodes opposed to the top electrode. The resulting system can achieve roughly the same color states as compared to supplying each drive electrode with six independent drive levels and ground. Thus, the system simplifies the required electronics with only marginal loss in color gamut. The system is particularly useful for addressing an electrophoretic medium including four sets of different particles, e.g., wherein three of the particles are colored and subtractive and one of the particles is light-scattering.

20 Claims, 9 Drawing Sheets
(1 of 9 Drawing Sheet(s) Filed in Color)

Related U.S. Application Data

(60) Provisional application No. 63/320,524, filed on Mar. 16, 2022, provisional application No. 63/078,829, filed on Sep. 15, 2020.

(56) References Cited

U.S. PATENT DOCUMENTS

| | | |
|---|---|---|
| 5,872,552 A | 2/1999 | Gordon, II et al. |
| 5,930,026 A | 7/1999 | Jacobson |
| 6,017,584 A | 1/2000 | Albert et al. |
| 6,081,285 A | 6/2000 | Wen et al. |
| 6,130,774 A | 10/2000 | Albert et al. |
| 6,144,361 A | 11/2000 | Gordon, II et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,538,801 B2 | 3/2003 | Jacobson et al. |
| 6,545,797 B2 | 4/2003 | Chen et al. |
| 6,664,944 B1 | 12/2003 | Albert et al. |
| 6,672,921 B1 | 1/2004 | Liang et al. |
| 6,727,873 B2 | 4/2004 | Gordon, II et al. |
| 6,753,999 B2 | 6/2004 | Zehner et al. |
| 6,788,449 B2 | 9/2004 | Liang et al. |
| 6,788,452 B2 | 9/2004 | Liang et al. |
| 6,822,782 B2 | 11/2004 | Honeyman et al. |
| 6,825,970 B2 | 11/2004 | Goenaga et al. |
| 6,866,760 B2 | 3/2005 | Paolini, Jr. et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,012,735 B2 | 3/2006 | Honeyman |
| 7,023,420 B2 | 4/2006 | Comiskey et al. |
| 7,034,783 B2 | 4/2006 | Gates et al. |
| 7,038,656 B2 | 5/2006 | Liang et al. |
| 7,038,670 B2 | 5/2006 | Liang et al. |
| 7,046,228 B2 | 5/2006 | Liang et al. |
| 7,052,571 B2 | 5/2006 | Wang et al. |
| 7,061,166 B2 | 6/2006 | Kuniyasu |
| 7,061,662 B2 | 6/2006 | Chung et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,144,942 B2 | 12/2006 | Zang et al. |
| 7,167,155 B1 | 1/2007 | Albert et al. |
| 7,170,670 B2 | 1/2007 | Webber |
| 7,176,880 B2 | 2/2007 | Amundson et al. |
| 7,177,066 B2 | 2/2007 | Chung et al. |
| 7,193,625 B2 | 3/2007 | Danner et al. |
| 7,202,847 B2 | 4/2007 | Gates |
| 7,230,750 B2 | 6/2007 | Whitesides et al. |
| 7,236,291 B2 | 6/2007 | Kaga et al. |
| 7,242,514 B2 | 7/2007 | Chung et al. |
| 7,259,744 B2 | 8/2007 | Arango et al. |
| 7,283,119 B2 | 10/2007 | Kishi |
| 7,312,784 B2 | 12/2007 | Baucom et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,147 B2 | 3/2008 | Chopra et al. |
| 7,397,597 B2 | 7/2008 | Verschueren et al. |
| 7,408,699 B2 | 8/2008 | Wang et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,492,339 B2 | 2/2009 | Amundson |
| 7,499,211 B2 | 3/2009 | Suwabe et al. |
| 7,528,822 B2 | 5/2009 | Amundson et al. |
| 7,535,624 B2 | 5/2009 | Amundson et al. |
| 7,561,324 B2 | 7/2009 | Duthaler et al. |
| 7,583,251 B2 | 9/2009 | Arango et al. |
| 7,602,374 B2 | 10/2009 | Zehner et al. |
| 7,612,760 B2 | 11/2009 | Kawai |
| 7,656,576 B2 | 2/2010 | Suwabe et al. |
| 7,679,599 B2 | 3/2010 | Kawai |
| 7,679,813 B2 | 3/2010 | Liang et al. |
| 7,679,814 B2 | 3/2010 | Paolini, Jr. et al. |
| 7,683,606 B2 | 3/2010 | Kang et al. |
| 7,715,088 B2 | 5/2010 | Liang et al. |
| 7,839,564 B2 | 11/2010 | Whitesides et al. |
| 7,848,009 B2 | 12/2010 | Machida et al. |
| 7,859,742 B1 | 12/2010 | Chiu et al. |
| 7,885,457 B2 | 2/2011 | Hirano et al. |
| 7,910,175 B2 | 3/2011 | Webber |
| 7,952,557 B2 | 5/2011 | Amundson |
| 7,952,790 B2 | 5/2011 | Honeyman et al. |
| 7,982,479 B2 | 7/2011 | Wang et al. |
| 7,982,941 B2 | 7/2011 | Lin et al. |
| 7,999,787 B2 | 8/2011 | Amundson et al. |
| 8,009,348 B2 | 8/2011 | Zehner et al. |
| 8,023,176 B2 | 9/2011 | Akashi et al. |
| 8,031,392 B2 | 10/2011 | Hiji et al. |
| 8,040,594 B2 | 10/2011 | Paolini, Jr. et al. |
| 8,054,526 B2 | 11/2011 | Bouchard |
| 8,077,141 B2 | 12/2011 | Duthaler et al. |
| 8,098,418 B2 | 1/2012 | Paolini, Jr. et al. |
| 8,125,501 B2 | 2/2012 | Amundson et al. |
| 8,139,050 B2 | 3/2012 | Jacobson et al. |
| 8,159,636 B2 | 4/2012 | Sun et al. |
| 8,174,490 B2 | 5/2012 | Whitesides et al. |
| 8,174,491 B2 | 5/2012 | Machida et al. |
| 8,243,013 B1 | 8/2012 | Sprague et al. |
| 8,262,883 B2 | 9/2012 | Muller et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,314,784 B2 | 11/2012 | Ohkami et al. |
| 8,319,759 B2 | 11/2012 | Jacobson et al. |
| 8,363,299 B2 | 1/2013 | Paolini, Jr. et al. |
| 8,373,649 B2 | 2/2013 | Low et al. |
| 8,384,658 B2 | 2/2013 | Albert et al. |
| 8,390,918 B2 | 3/2013 | Wilcox et al. |
| 8,422,116 B2 | 4/2013 | Sprague et al. |
| 8,432,606 B2 | 4/2013 | Park et al. |
| 8,456,414 B2 | 6/2013 | Lin et al. |
| 8,462,102 B2 | 6/2013 | Wong et al. |
| 8,477,404 B2 | 7/2013 | Moriyama et al. |
| 8,503,063 B2 | 8/2013 | Sprague |
| 8,514,168 B2 | 8/2013 | Chung et al. |
| 8,520,286 B2 | 8/2013 | Clapp et al. |
| 8,537,105 B2 | 9/2013 | Chiu et al. |
| 8,542,431 B2 | 9/2013 | Shuto et al. |
| 8,558,783 B2 | 10/2013 | Wilcox et al. |
| 8,558,786 B2 | 10/2013 | Lin |
| 8,558,855 B2 | 10/2013 | Sprague et al. |
| 8,576,164 B2 | 11/2013 | Sprague et al. |
| 8,576,259 B2 | 11/2013 | Lin et al. |
| 8,576,470 B2 | 11/2013 | Paolini, Jr. et al. |
| 8,576,475 B2 | 11/2013 | Huang et al. |
| 8,576,476 B2 | 11/2013 | Telfer et al. |
| 8,582,196 B2 | 11/2013 | Walls et al. |
| 8,587,859 B2 | 11/2013 | Kayashima et al. |
| 8,605,032 B2 | 12/2013 | Liu et al. |
| 8,605,354 B2 | 12/2013 | Zhang et al. |
| 8,649,084 B2 | 2/2014 | Wang et al. |
| 8,665,206 B2 | 3/2014 | Lin et al. |
| 8,670,174 B2 | 3/2014 | Sprague et al. |
| 8,681,191 B2 | 3/2014 | Yang et al. |
| 8,704,754 B2 | 4/2014 | Machida et al. |
| 8,704,756 B2 | 4/2014 | Lin |
| 8,717,664 B2 | 5/2014 | Wang et al. |
| 8,730,216 B2 | 5/2014 | Mizutani et al. |
| 8,786,935 B2 | 7/2014 | Sprague |
| 8,797,634 B2 | 8/2014 | Paolini, Jr. et al. |
| 8,810,525 B2 | 8/2014 | Sprague |

(56) References Cited

U.S. PATENT DOCUMENTS

| | | | |
|---|---|---|---|
| 8,873,129 B2 | 10/2014 | Paolini, Jr. et al. |
| 8,896,908 B2 | 11/2014 | Shuto et al. |
| 8,902,153 B2 | 12/2014 | Bouchard et al. |
| 8,902,491 B2 | 12/2014 | Wang et al. |
| 8,917,439 B2 | 12/2014 | Wang et al. |
| 8,928,562 B2 | 1/2015 | Gates et al. |
| 8,928,641 B2 | 1/2015 | Chiu et al. |
| 8,952,885 B2 | 2/2015 | Suwabe et al. |
| 8,963,147 B2 | 2/2015 | Imamura et al. |
| 8,963,903 B2 | 2/2015 | Sakamoto et al. |
| 8,964,282 B2 | 2/2015 | Wang et al. |
| 8,976,444 B2 | 3/2015 | Zhang et al. |
| 8,982,447 B2 | 3/2015 | Shen et al. |
| 9,013,394 B2 | 4/2015 | Lin |
| 9,013,516 B2 | 4/2015 | Sakamoto et al. |
| 9,013,783 B2 | 4/2015 | Sprague |
| 9,019,197 B2 | 4/2015 | Lin |
| 9,019,198 B2 | 4/2015 | Lin et al. |
| 9,019,318 B2 | 4/2015 | Sprague et al. |
| 9,082,352 B2 | 7/2015 | Cheng et al. |
| 9,116,412 B2 | 8/2015 | Lin |
| 9,146,439 B2 | 9/2015 | Zhang |
| 9,152,005 B2 | 10/2015 | Morikawa et al. |
| 9,170,468 B2 | 10/2015 | Lin et al. |
| 9,182,646 B2 | 11/2015 | Paolini, Jr. et al. |
| 9,195,111 B2 | 11/2015 | Anseth et al. |
| 9,199,441 B2 | 12/2015 | Danner |
| 9,218,773 B2 | 12/2015 | Sun et al. |
| 9,224,338 B2 | 12/2015 | Chan et al. |
| 9,224,342 B2 | 12/2015 | Sprague et al. |
| 9,224,344 B2 | 12/2015 | Chung et al. |
| 9,230,492 B2 | 1/2016 | Harrington et al. |
| 9,251,736 B2 | 2/2016 | Lin et al. |
| 9,262,973 B2 | 2/2016 | Wu et al. |
| 9,268,191 B2 | 2/2016 | Paolini, Jr. et al. |
| 9,279,906 B2 | 3/2016 | Kang |
| 9,285,649 B2 | 3/2016 | Du et al. |
| 9,299,294 B2 | 3/2016 | Lin et al. |
| 9,348,193 B2 | 5/2016 | Hiji et al. |
| 9,360,733 B2 | 6/2016 | Wang et al. |
| 9,361,836 B1 | 6/2016 | Telfer et al. |
| 9,383,623 B2 | 7/2016 | Lin et al. |
| 9,390,066 B2 | 7/2016 | Smith et al. |
| 9,390,661 B2 | 7/2016 | Chiu et al. |
| 9,423,666 B2 | 8/2016 | Wang et al. |
| 9,429,810 B2 | 8/2016 | Kaino et al. |
| 9,459,510 B2 | 10/2016 | Lin |
| 9,460,666 B2 | 10/2016 | Sprague et al. |
| 9,494,808 B2 | 11/2016 | Farrand et al. |
| 9,495,918 B2 | 11/2016 | Harrington et al. |
| 9,501,981 B2 | 11/2016 | Lin et al. |
| 9,513,527 B2 | 12/2016 | Chan et al. |
| 9,513,743 B2 | 12/2016 | Sjodin et al. |
| 9,514,667 B2 | 12/2016 | Lin |
| 9,541,813 B2 | 1/2017 | Sakamoto et al. |
| 9,541,814 B2 | 1/2017 | Lin et al. |
| 9,612,502 B2 | 4/2017 | Danner et al. |
| 9,620,048 B2 | 4/2017 | Sim et al. |
| 9,671,668 B2 | 6/2017 | Chan et al. |
| 9,672,766 B2 | 6/2017 | Sjodin |
| 9,691,333 B2 | 6/2017 | Cheng et al. |
| 9,697,778 B2 | 7/2017 | Telfer et al. |
| 9,721,495 B2 | 8/2017 | Harrington et al. |
| 9,759,978 B2 | 9/2017 | Liu |
| 9,759,980 B2 | 9/2017 | Du et al. |
| 9,761,180 B2 | 9/2017 | Ogawa |
| 9,792,861 B2 | 10/2017 | Chang et al. |
| 9,792,862 B2 | 10/2017 | Hung et al. |
| 9,812,073 B2 | 11/2017 | Lin et al. |
| 9,868,803 B2 | 1/2018 | Farrand et al. |
| 9,921,451 B2 | 3/2018 | Telfer et al. |
| 10,031,394 B2 | 7/2018 | Nakayama et al. |
| 10,036,929 B2 | 7/2018 | Du et al. |
| 10,037,735 B2 | 7/2018 | Amundson |
| 10,162,242 B2 | 12/2018 | Wang et al. |
| 10,209,556 B2 | 2/2019 | Rosenfeld et al. |
| 10,229,641 B2 | 3/2019 | Yang et al. |
| 10,276,109 B2 | 4/2019 | Crounse et al. |
| 10,319,313 B2 | 6/2019 | Harris et al. |
| 10,339,876 B2 | 7/2019 | Lin et al. |
| 10,353,266 B2 | 7/2019 | Bouchard et al. |
| 10,372,008 B2 | 8/2019 | Telfer et al. |
| 10,444,553 B2 | 10/2019 | Laxton |
| 10,467,984 B2 | 11/2019 | Buckley et al. |
| 10,593,272 B2 | 3/2020 | Telfer et al. |
| 10,672,350 B2 | 6/2020 | Amundson et al. |
| 10,678,111 B2 | 6/2020 | Telfer et al. |
| 10,782,586 B2 | 9/2020 | Liu et al. |
| 10,891,906 B2 | 1/2021 | Lin |
| 2003/0102858 A1 | 6/2003 | Jacobson et al. |
| 2004/0246562 A1 | 12/2004 | Chung et al. |
| 2005/0253777 A1 | 11/2005 | Zehner et al. |
| 2007/0103427 A1 | 5/2007 | Zhou et al. |
| 2007/0176912 A1 | 8/2007 | Beames et al. |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0062159 A1 | 3/2008 | Roh et al. |
| 2008/0136774 A1 | 6/2008 | Harris et al. |
| 2008/0303780 A1 | 12/2008 | Sprague et al. |
| 2009/0009852 A1 | 1/2009 | Honeyman et al. |
| 2009/0122389 A1 | 5/2009 | Whitesides et al. |
| 2009/0184919 A1* | 7/2009 | Shinn .................. G02F 1/16753 345/107 |
| 2010/0006441 A1 | 1/2010 | Renaud et al. |
| 2010/0060628 A1 | 3/2010 | Lenssen et al. |
| 2010/0156780 A1 | 6/2010 | Jacobson et al. |
| 2010/0194733 A1 | 8/2010 | Lin et al. |
| 2010/0194789 A1 | 8/2010 | Lin et al. |
| 2010/0220121 A1 | 9/2010 | Zehner et al. |
| 2010/0265561 A1 | 10/2010 | Gates et al. |
| 2011/0043543 A1 | 2/2011 | Chen et al. |
| 2011/0063314 A1 | 3/2011 | Chiu et al. |
| 2011/0175875 A1 | 7/2011 | Lin et al. |
| 2011/0175939 A1 | 7/2011 | Moriyama et al. |
| 2011/0221740 A1 | 9/2011 | Yang et al. |
| 2012/0001957 A1 | 1/2012 | Liu et al. |
| 2012/0098740 A1 | 4/2012 | Chiu et al. |
| 2012/0307343 A1 | 12/2012 | Lai et al. |
| 2013/0063333 A1 | 3/2013 | Arango et al. |
| 2013/0222884 A1 | 8/2013 | Moriyama et al. |
| 2013/0222886 A1 | 8/2013 | Kawahara et al. |
| 2013/0222888 A1 | 8/2013 | Urano et al. |
| 2013/0249782 A1 | 9/2013 | Wu et al. |
| 2013/0250398 A1 | 9/2013 | Takanashi et al. |
| 2014/0009818 A1 | 1/2014 | Brochon et al. |
| 2014/0011913 A1 | 1/2014 | Du et al. |
| 2014/0055840 A1 | 2/2014 | Zang et al. |
| 2014/0078576 A1 | 3/2014 | Sprague |
| 2014/0204012 A1 | 7/2014 | Wu et al. |
| 2014/0240210 A1 | 8/2014 | Wu et al. |
| 2014/0253425 A1 | 9/2014 | Zalesky et al. |
| 2014/0293398 A1 | 10/2014 | Wang et al. |
| 2014/0362213 A1 | 12/2014 | Tseng |
| 2015/0005720 A1 | 1/2015 | Zang et al. |
| 2015/0262255 A1 | 9/2015 | Khajehnouri et al. |
| 2015/0268531 A1 | 9/2015 | Wang et al. |
| 2015/0301246 A1 | 10/2015 | Zang et al. |
| 2016/0012710 A1 | 1/2016 | Lu et al. |
| 2016/0180777 A1 | 6/2016 | Lin et al. |
| 2020/0348576 A1 | 11/2020 | Visani et al. |

FOREIGN PATENT DOCUMENTS

| | | |
|---|---|---|
| JP | 2013250325 A | 12/2013 |
| KR | 20070071037 A | 7/2007 |
| KR | 20070074967 A | 7/2007 |
| KR | 20130076200 A | 7/2013 |

(56) References Cited

OTHER PUBLICATIONS

Kitamura, T. et al., "Electrical toner movement for electronic paper-like display", Asia Display/IDW '01, pp. 1517-1520, Paper HCS1-1 (2001). 2001.

Yamaguchi, Y. et al., "Toner display using insulative particles charged triboelectrically", Asia Display/IDW '01, pp. 1729-1730, Paper AMD4-4 (2001). 2001.

Heikenfeld, J. et al., "A critical review of the present and future prospects for electronic paper", SID, 19(2), pp. 129-156 (2011). 2011.

\* cited by examiner

| White | Yellow | Magenta | | Cyan | | | |
|---|---|---|---|---|---|---|---|
| | | | Magenta | | Magenta | Yellow | Cyan |
| | | | | | | | Magenta |
| | White | White | White | White | White | White | White |
| Cyan | Magenta | | | | | | Yellow |
| | | | | | | | |

Cyan  Cyan  Cyan  Yellow  Yellow  Magenta
Magenta  Magenta  Yellow
Yellow

White  Red  Magenta  Blue  Cyan  Green  Black

[A]  [B]  [C]  [D]  [E]  [F]  [G]  [H]

COORDINATED TOP ELECTRODE—DRIVE ELECTRODE VOLTAGES FOR SWITCHING OPTICAL STATE OF ELECTROPHORETIC DISPLAYS USING POSITIVE AND NEGATIVE VOLTAGES OF DIFFERENT MAGNITUDES

RELATED APPLICATIONS

This application is a continuation-in-part of U.S. patent application Ser. No. 17/474,375, filed Sep. 14, 2021, which claims priority to U.S. Provisional Application No. 63/078,829, filed. Sep. 15, 2020. This application additionally claims priority to U.S. Provisional Patent Application No. 63/320,524, filed Mar. 16, 2022. All patents and publications disclosed herein are incorporated by reference in their entireties.

BACKGROUND

An electrophoretic display (EPD) changes color by modifying the position of a charged colored particle with respect to a light-transmissive viewing surface. Such electrophoretic displays are typically referred to as "electronic paper" or "ePaper" because the resulting display has high contrast and is sunlight-readable, much like ink on paper. Electrophoretic displays have enjoyed widespread adoption in eReaders, such as the AMAZON KINDLE® because the electrophoretic displays provide a book-like reading experience, use little power, and allow a user to carry a library of hundreds of books in a lightweight handheld device.

For many years, electrophoretic displays included only two types of charged color particles, black and white. (To be sure, "color" as used herein includes black and white.) The white particles are often of the light scattering type, and comprise, e.g., titanium dioxide, while the black particle are absorptive across the visible spectrum, and may comprise carbon black, or an absorptive metal oxide, such as copper chromite. In the simplest sense, a black and white electrophoretic display only requires a light-transmissive electrode at the viewing surface, a back electrode, and an electrophoretic medium including oppositely charged white and black particles. When a voltage of one polarity is provided, the white particles move to the viewing surface, and when a voltage of the opposite polarity is provided the black particles move to the viewing surface. If the back electrode includes controllable regions (pixels)—either segmented electrodes or an active matrix of pixel electrodes controlled by transistors—a pattern can be made to appear electronically at the viewing surface. The pattern can be, for example, the text to a book.

More recently, a variety of color option have become commercially available for electrophoretic displays, including three-color displays (black, white, red; black white, yellow), and four color displays (black, white, red, yellow). Similar to the operation of black and white electrophoretic displays, electrophoretic displays with three or four reflective pigments operate similar to the simple black and white displays because the desired color particle is driven to the viewing surface. The driving schemes are far more complicated than only black and white, but in the end, the optical function of the particles is the same.

Advanced Color electronic Paper (ACeP™) also includes four particles, but the cyan, yellow, and magenta particles are subtractive rather than reflective, thereby allowing thousands of colors to be produced at each pixel. The color process is functionally equivalent to the printing methods that have long been used in offset printing and ink-jet printers. A given color is produced by using the correct ratio of cyan, yellow, and magenta on a bright white paper background. In the instance of ACeP, the relative positions of the cyan, yellow, magenta and white particles with respect to the viewing surface will determine the color at each pixel. While this type of electrophoretic display allows for thousands of colors at each pixel, it is critical to carefully control the position of each of the (50 to 500 nanometer-sized) pigments within a working space of about 10 to 20 micrometers in thickness. Obviously, variations in the position of the pigments will result in incorrect colors being displayed at a given pixel. Accordingly, exquisite voltage control is required for such a system. More details of this system are available in the following U.S. Patents, all of which are incorporated by reference in their entireties: U.S. Pat. Nos. 9,361,836, 9,921,451, 10,276,109, 10,353,266, 10,467,984, and 10,593,272.

This invention relates to color electrophoretic displays, especially, but not exclusively, to electrophoretic displays capable of rendering more than two colors using a single layer of electrophoretic material comprising a plurality of colored particles, for example white, cyan, yellow, and magenta particles. In some instances two of the particles will be positively-charged, and two particles will be negatively-charged. In some instances three of the particles will be positively-charged, and one particle will be negatively-charged. In some instances, one positively-charged particle will have a thick polymer shell and one negatively-charged particle has a thick polymer shell.

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an electrophoretic display, is used herein to refer to the integral of the applied voltage with respect to time during the period m which the display is driven.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, hinders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

(h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/

0071465; 2016/0078820; 2016/0093253; 2016/0140910; and 2016/0180777 (these patents and applications may hereinafter be referred to as the MEDEOD (MEthods for Driving Electro-optic Displays) applications);

(i) Applications of displays; see for example U.S. Pat. Nos. 7,312,784 and 8,009,348; and (j) Non-electrophoretic displays, as described in U.S. Pat. No. 6,241,921; and U.S. Patent Applications Publication Nos. 2015/0277160; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

As indicated above most simple prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array may be deposited over the viewing surface of the monochrome (black and white) display.

Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

A commonly used system for quantifying the color characteristics of a display, including both brightness and hue is the CIELAB system, which assigns color coordinate values (i.e., $L^*$, $a^*$, $b^*$) corresponding to colors displayed by typical color reflective display devices under a CIE standard illuminant D65 (e.g., with color temperature 6500K). $L^*$ represents lightness from black to white on a scale of zero to 100, while $a^*$ and $b^*$ represent chromaticity with no specific numeric limits. Negative $a^*$ corresponds with green, positive $a^*$ corresponds with red, negative $b^*$ corresponds with blue and positive b* corresponds with yellow. L* can be converted to reflectance with the following formula: $L^*=116(R/R_0)^{1/3}-16$, where R is the reflectance and $R_0$ is a standard reflectance value.

U.S. Pat. Nos. 8,576,476 and 8,797,634 describe multi-color electrophoretic displays having a single back plane comprising independently addressable pixel electrodes and a common, light-transmissive front electrode. The common, light-transmissive front electrode is also known as the top electrode. Between the back plane and the front electrode is disposed a plurality of electrophoretic layers. Displays described in these applications are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (for example, caused by light scattering or unwanted absorption) may affect the appearance of images formed in underlying electrophoretic layers.

Attempts have been made to provide full-color electrophoretic displays using a single electrophoretic layer. For example, U.S. Pat. No. 8,917,439 describes a color display comprising an electrophoretic fluid that comprises one or two types of pigment particles dispersed in a clear and colorless or colored solvent, the electrophoretic fluid being disposed between a common electrode and a plurality of pixel or driving electrodes. The driving electrodes are arranged to expose a background layer. U.S. Pat. No. 9,116,412 describes a method for driving a display cell filled with an electrophoretic fluid comprising two types of charged particles carrying opposite charge polarities and of two contrast colors. The two types of pigment particles are dispersed in a colored solvent or in a solvent with non-charged or slightly charged colored particles dispersed therein. The method comprises driving the display cell to display the color of the solvent or the color of the non-charged or slightly charged colored particles by applying a driving voltage that is about 1 to about 20% of the full driving voltage. U.S. Pat. Nos. 8,717,664 and 8,964,282 describe an electrophoretic fluid, and a method for driving an electrophoretic display. The fluid comprises first, second and third type of pigment particles, all of which are dispersed in a solvent or solvent mixture. The first and second types of pigment particles carry opposite charge polarities, and the third type of pigment particles has a charge level being less than about 50% of the charge level of the first or second type. The three types of pigment particles have different levels of threshold voltage, or different levels of mobility, or both. None of these patent applications disclose full color display in the sense in which that term is used below, that is capable of achieving at least eight independent colors (white, red, green, blue, cyan, yellow, magenta, and black).

SUMMARY

Disclosed herein are improved methods of driving full color electrophoretic displays and full color electrophoretic displays using these drive methods. In one aspect, the invention involves a color electrophoretic display including a light-transmissive electrode at a viewing surface, a backplane including an array of thin film transistors coupled to pixel electrodes, wherein each thin film transistor comprising a layer of a metal oxide semiconductor, and a color electrophoretic medium disposed between the light-transmissive electrode and the backplane. The color electrophoretic medium includes (a) a fluid, (b) a plurality of first and a plurality of second particles dispersed in the fluid, the first and second particles bearing charges of opposite polarity, the first particle being a light-scattering particle and the second particle having one of the subtractive primary colors, and (c) a plurality of third and a plurality of fourth particles dispersed in the fluid, the third and fourth particles bearing charges of opposite polarity, the third and fourth particles each having a subtractive primary color different from each other and from the second particles.

In some embodiments, a first electric field required to separate an aggregate formed by the third and the fourth types of particles is greater than a second electric field required to separate an aggregate formed from any other two types of particles. In some embodiments, at least two of the second, third and fourth particles are non-light-scattering. In some embodiments, the first particles are white and the second, third and fourth particles are non-light-scattering. In some embodiments, the first and third particles are negatively charged and the second and fourth particles are positively charged. In some embodiments, the first, second, third and fourth particles are respectively white, cyan, yellow and magenta in color, with the white and yellow particles being negatively charged and the magenta and cyan particles positively charged. In some embodiments, the yellow, magenta and cyan pigments exhibit diffuse reflectances at 650, 550 and 450 nm, respectively, measured over a black background, of less than 2.5% when the pigment is approximately isotropically distributed at 15% by volume in a layer of thickness 1 μm comprising the pigment and a liquid of refractive index less than 1.55. In some embodiments, the liquid is a non-polar liquid having a dielectric constant less than about 5. In some embodiments, the fluid has have dissolved or dispersed therein a polymer having a number average molecular weight in excess of about 20,000 and being essentially non-absorbing on the particles. In some embodiments, the metal oxide semiconductor is indium gallium zinc oxide (IGZO). The inventions above may be incorporated into an electronic book reader, portable computer, tablet computer, cellular telephone, smart card, sign, watch, shelf label or flash drive.

In another aspect, a color electrophoretic display including a controller, a light-transmissive electrode at a viewing surface, and a backplane including an array of thin film transistors coupled to pixel electrodes, each thin film transistor comprising a layer of a metal oxide semiconductor. A color electrophoretic medium is disposed between the light-transmissive electrode and the backplane, and the color electrophoretic medium includes (a) a fluid, (b) a plurality of first and a plurality of second particles dispersed in the fluid, the first and second particles bearing charges of opposite polarity, the first particle being a light-scattering particle and the second particle having one of the subtractive primary colors, and (c) a plurality of third and a plurality of fourth particles dispersed in the fluid, the third and fourth particles bearing charges of opposite polarity, the third and fourth particles each having a subtractive primary color different from each other and from the second particles. The controller is configured to provide a plurality of driving voltages to the pixel electrodes such that white, yellow, red, magenta, blue, cyan, green, and black can be displayed at each pixel electrode while keeping the light-transmissive electrode at a constant voltage. In some embodiments, the controller is configured to provide a voltage of greater than 25 Volts and less than −25 Volts to the pixel electrodes. In some embodiments, the controller is configured to additionally provide a voltage between 25 V and 0V and a voltage between −25V and 0V. In some embodiments, the metal oxide semiconductor is indium gallium zinc oxide (IGZO).

In another aspect, a color electrophoretic display including a controller, a light-transmissive electrode at a viewing surface, a backplane electrode, and a color electrophoretic medium disposed between the light-transmissive electrode and the backplane electrode. The color electrophoretic medium includes (a) a fluid, (b) a plurality of first and a plurality of second particles dispersed in the fluid, the first and second particles bearing charges of opposite polarity, the first particle being a light-scattering particle and the second particle having one of the subtractive primary colors, and (c) a plurality of third and a plurality of fourth particles dispersed in the fluid, the third and fourth particles bearing charges of opposite polarity, the third and fourth particles each having a subtractive primary color different from each other and from the second particles. The controller is configured to provide a first high voltage and a first low voltage to the light transmissive electrode, and a second high voltage, a zero voltage, and a second low voltage to the backplane electrode, such that the colors white, yellow, red, magenta, blue, cyan, green, and black can be displayed at the viewing surface, wherein the magnitude of at least one of the first high voltage, the first low voltage, the second high voltage, and the second low voltage are not the same. In some embodiments, the magnitude of the first high voltage and the magnitude of the second high voltage are the same. In some embodiments, the magnitude of the first low voltage and the magnitude of the second low voltage are the same, and the magnitude of the first high voltage and the magnitude of the first low voltage are not the same.

In another aspect, a color electrophoretic display including a controller; a light-transmissive electrode at a viewing surface, a backplane electrode, and a color electrophoretic medium disposed between the light-transmissive electrode and the backplane electrode. The color electrophoretic medium includes (a) a fluid, (b) a plurality of first and a plurality of second particles dispersed in the fluid, the first and second particles bearing charges of opposite polarity, the first particle being a light-scattering particle and the second particle having one of the subtractive primary colors; and (c) a plurality of third and a plurality of fourth particles dispersed in the fluid, the third and fourth particles bearing charges of opposite polarity, the third and fourth particles each having a subtractive primary color different from each other and from the second particles. The controller is configured to cause the colors white, yellow, red, magenta, blue, cyan, green, and black color to be displayed at the viewing surface by providing one of a plurality of time dependent drive voltages to the backplane electrode while providing one of the foil owing drive voltage to the light-transmissive electrode 1) a high voltage for time a first time, a low voltage for a second time, and a high voltage for a third time, or 2) a low voltage for time a first time, a high voltage for a second time, and a low voltage for a third time.

In another aspect, a system for driving an electrophoretic medium, comprising an electrophoretic display, a power source capable of providing a positive voltage and a negative voltage, where the magnitude of the positive voltage and the negative voltage are different, and a controller coupled to the top electrode driver, the first drive electrode driver, and the second drive electrode driver. The electrophoretic medium includes a light-transmissive top electrode at a viewing surface, a first drive electrode, a second drive electrode, and an electrophoretic medium disposed between the top electrode and the first and second drive electrodes. The controller is configured to provide A) in a first frame, the positive voltage to the top electrode, the negative voltage to the first drive electrode, and the positive voltage to the second drive electrode, B) in a second frame, the negative voltage to the top electrode, the negative voltage to the first drive electrode, and the negative voltage to the second drive electrode, C) in a third frame, the ground voltage to the top electrode, the ground voltage to the first drive electrode, and the positive voltage to the second drive electrode, and D) in a fourth frame, the positive voltage to the top electrode, the positive voltage to the first drive electrode, and the positive voltage to the second drive electrode. In one embodiment, the controller is configured to further provide E) in a fifth frame, the negative voltage to the top electrode, the ground voltage to the first drive electrode, and the negative voltage to the second drive electrode, and F) in a sixth frame, the ground voltage to the top electrode, the ground voltage to the first drive electrode, and the ground voltage to the second drive electrode. In one embodiment, the electrophoretic medium is encapsulated in a plurality of microcapsules and the microcapsules are dispersed in a polymer binder between the top electrode and the first and second drive electrodes. In one embodiment, the electrophoretic medium is encapsulated in an array of microcells having openings wherein the opening are sealed with a polymer binder, and the array of microcells is disposed between the top electrode and the first and second drive electrodes. In one embodiment, the electrophoretic medium comprises a non-polar fluid and four sets of particles having different optical properties. In one embodiment, the first and second sets of particles bear charges of opposite polarity, the third and fourth sets of particles bear charges of opposite polarity, the first particle is a light-scattering particle, and the second, third, and fourth sets of particles are each a subtractive primary color different from each other. In one embodiment, the controller is configured to provide combinations of the positive voltage, the negative voltage, and the ground voltage to the top electrode and the first drive electrode such that the colors white, yellow, red, magenta, blue, cyan, green, and black can be displayed at the viewing surface. In one embodiment, the first and second sets of particles bear charges of opposite polarity, the third and fourth sets of particles bear the same charge as the second particle, the first particle is a light-scattering particle, and the second, third, and fourth sets of particles are each a subtractive primary color different from each other. In one embodiment, the controller is configured to provide combinations of the positive voltage, the negative voltage, and the ground voltage to the top electrode and the first drive electrode such that the colors white, yellow, red, magenta, blue, cyan, green, and black can be displayed at the viewing surface. In one embodiment, the positive voltage is +15V and the negative voltage is −9V. In one embodiment, the positive voltage is +9V and the negative voltage is −15V.

In another aspect, a system for driving an electrophoretic medium, comprising an electrophoretic display, a power source capable of providing a positive voltage and a negative voltage, where the magnitude of the positive voltage and the negative voltage are different, and a controller coupled to the top electrode driver, the first drive electrode driver, and the second drive electrode driver. The electrophoretic medium includes a light-transmissive top electrode at a viewing surface, a first drive electrode, a second drive electrode, and an electrophoretic medium disposed between the top electrode and the first and second drive electrodes. The controller is configured to provide A) in a first frame, the positive voltage to the top electrode, the negative voltage to the first drive electrode, and the positive voltage to the second drive electrode, B) in a second frame, the negative voltage to the top electrode, the negative voltage to the first drive electrode, and the negative voltage to the second drive electrode, C) in a third frame, the ground voltage to the top electrode, the ground voltage to the first drive electrode, and the ground voltage to the second drive electrode, and D) in a fourth frame, the positive voltage to the top electrode, the positive voltage to the first drive electrode, and the positive voltage to the second drive electrode. In one embodiment, the controller is configured to further provide E) in a fifth frame, the negative voltage to the top electrode, the ground voltage to the first drive electrode, and the negative voltage to the second drive electrode, and F) in a sixth frame, the ground voltage to the top electrode, the ground voltage to the first drive electrode, and the ground voltage to the second drive electrode. In one embodiment, the electrophoretic medium is encapsulated in a plurality of microcapsules and the microcapsules are dispersed in a polymer binder between the top electrode and the first and second drive electrodes. In one embodiment, the electrophoretic medium is encapsulated in an array of microcells having openings wherein the opening are sealed with a polymer binder, and the array of microcells is disposed between the top electrode and the first and second drive electrodes. In one embodiment, the electrophoretic medium comprises a non-polar fluid and four sets of particles having different optical properties. In one embodiment, the first and second sets of particles bear charges of opposite polarity, the third and fourth sets of particles bear charges of opposite polarity, the first particle is a light-scattering particle, and the second, third, and fourth sets of particles are each a subtractive primary color different from each other. In one embodiment, the controller is configured to provide combinations of the positive voltage, the negative voltage, and the ground voltage to the top electrode and the first drive electrode such that the colors white, yellow, red, magenta, blue, cyan, green, and black can be displayed at the viewing surface. In one embodiment, the first and second sets of particles bear charges of opposite polarity, the third and fourth sets of particles bear the same charge as the second particle, the first particle is a light-scattering particle, and the second, third, and fourth sets of particles are each a subtractive primary color different from each other. In one embodiment, the controller is configured to provide combinations of the positive voltage, the negative voltage, and the ground voltage to the top electrode and the first drive electrode such that the colors white, yellow, red, magenta, blue, cyan, green, and black can be displayed at the viewing surface. In one embodiment, the positive voltage is +15V and the negative voltage is −9 V. In one embodiment, the positive voltage is +9V and the negative voltage is −15V.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

A system for simplified driving of electrophoretic media using a positive and a negative voltage source, where the voltage sources have different magnitudes, and a controller that cycles the top electrode between the two voltage sources and ground while coordinating driving at least two drive electrodes opposed to the top electrode. The resulting system can achieve roughly the same color states as compared to supplying each drive electrode with six independent drive levels and ground. Thus, the system simplifies the required electronics with only marginal loss in color gamut. The system is particularly useful for addressing an electrophoretic medium including four sets of different particles, e.g., wherein three of the particles are colored and subtractive and one of the particles is light-scattering.

Figure 5:
FIG. 5 is a schematic cross-section showing the positions of the various colored particles in an colored electrophoretic medium when displaying black, white, three subtractive primary colors and three additive primary colors.

The invention provides improved methods of driving electro-optic media devices with so-called top-plane switching, i.e., where the voltage on the top (common) electrode is varied during the course of a device update. In some embodiments, the invention is used with an electrophoretic medium including four particles wherein two of the particles are colored and subtractive and at least one of the particles is scattering. Typically, such a system includes a white particle and cyan, yellow, and magenta subtractive primary colored particles. In some embodiments, two of the particles and positively-charged and two of the particles are negatively-charged. In some embodiments, three of the particles are positively-charged and one of the particles is negatively-charged. In some embodiments, one of the particles is positively-charged and three of the particles are negatively-charged. Such a system is shown schematically in FIG. 5, and it can provide white, yellow, red, magenta, blue, cyan, green, and black at every pixel.

A display device may be constructed using an electrophoretic fluid of the invention in several ways that are known in the prior art. The electrophoretic fluid may be encapsulated in microcapsules or incorporated into microcell structures that are thereafter sealed with a polymeric layer. The microcapsule or microcell layers may be coated or embossed onto a plastic substrate or film bearing a transparent coating of an electrically conductive material. This assembly may be laminated to a backplane bearing pixel electrodes using an electrically conductive adhesive. Alternatively, the electrophoretic fluid may be dispensed directly on a thin open-cell grid that has been arranged on a backplane including an active matrix of pixel electrodes. The filled grid can then be top-sealed with an integrated protective sheet/light-transmissive electrode.

Figure 1:
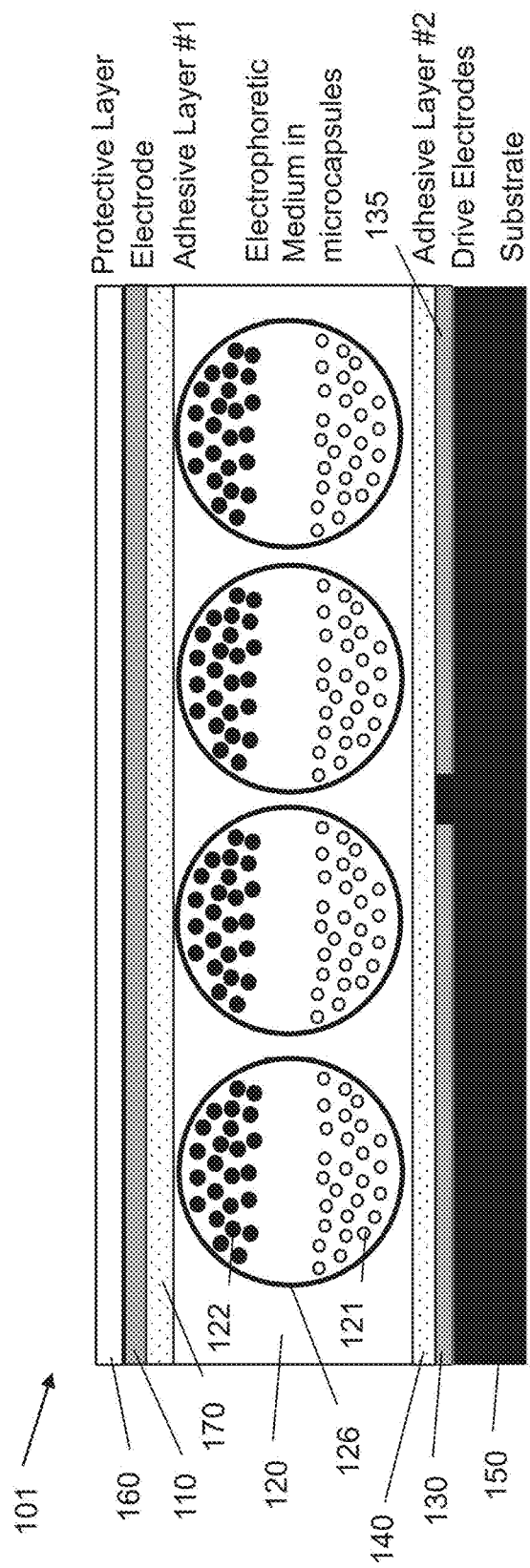
FIG. 1 is a schematic cross-section showing an embodiment of an encapsulated electrophoretic display suitable for use with the methods of the invention.
Figure 2:
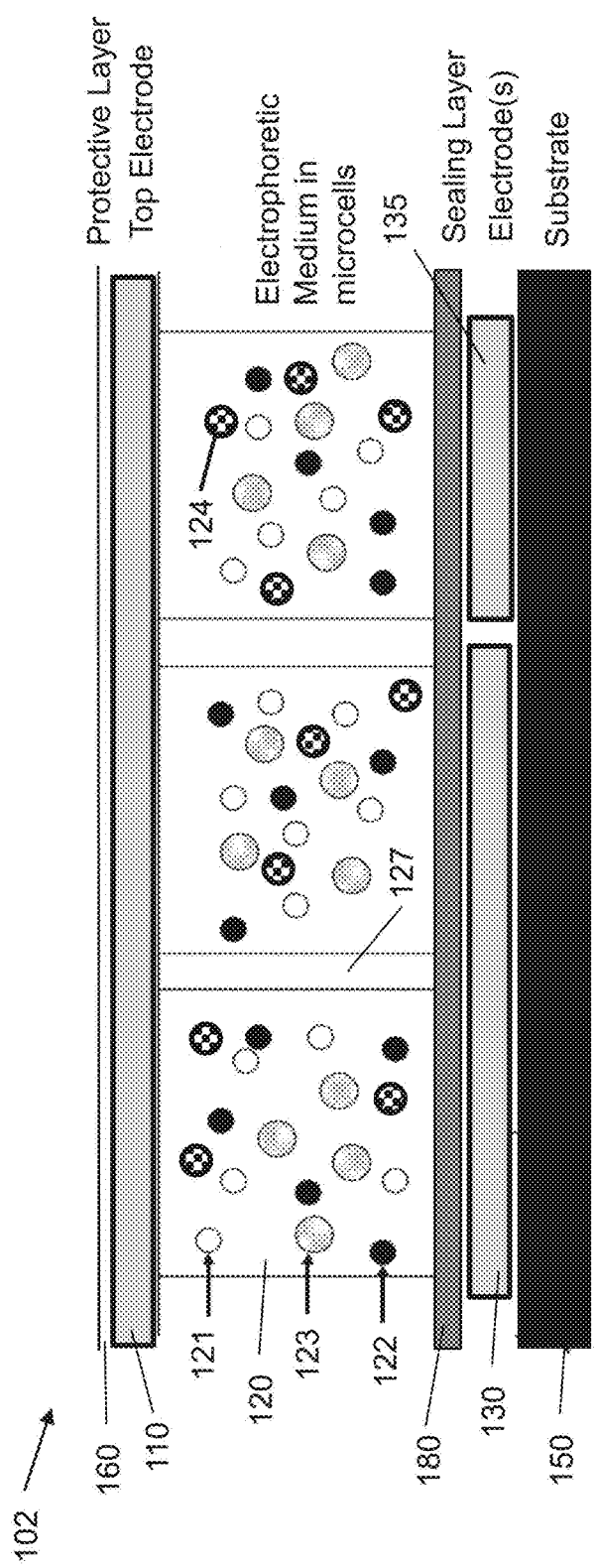
FIG. 2 is a schematic cross-section showing an embodiment of an encapsulated electrophoretic display suitable for use with the methods of the invention.

Regarding FIGS. 1 and 2, an electrophoretic display (101, 102) typically includes a top light-transmissive electrode 110, an electrophoretic medium 120, and bottom drive electrodes 130/135, which are often pixel electrodes of an active matrix of pixels controlled with thin film transistors (TFT). Alternatively, bottom drive electrodes 130/135 may be directly wired to a controller or some other switch that provides voltage to the bottom drive electrodes 130/135 to effect a change in the optical state of the electrophoretic medium 120, i.e., segmented electrodes. Importantly, it is not necessary that a junction between drive electrodes 130/135 corresponds with an intersection of microcapsules or with a wall 127 of a microcell. Because the electrophoretic medium 120 is sufficiently thin, and the capsules or microcells sufficiently wide, the pattern of the drive electrodes (square, circles, hexagons, wavy, text, or otherwise) will show when the display is viewed from the viewing surface; not the pattern of the containers. The electrophoretic medium 120 contains at least one electrophoretic particle 121, however a second electrophoretic particle 122, or a third electrophoretic particle 123, a fourth electrophoretic particle 124, or more particles is feasible. [It should be noted that third electrophoretic particles 123 and fourth electrophoretic particles 124 can be included within the microcapsules 126 of FIG. 1, but have been omitted for clarity.] The electrophoretic medium 120 typically includes a solvent, such as isoparaffins, and may also include dispersed polymers and charge control agents to facilitate state stability, e.g. bistability, i.e., the ability to maintain an electro-optic state without inputting any additional energy.

The electrophoretic medium 120 is typically compartmentalized such by a microcapsule 126 or the walls of a microcell 127. The entire display stack is typically disposed on a substrate 150, which may be rigid or flexible. The display (101, 102) typically also includes a protective layer 160, which may simply protect the top electrode 110 from damage, or it may envelop the entire display (101, 102) to prevent ingress of water, etc. Electrophoretic displays (101, 102) may also include one or more adhesive layers 140, 170, and/or sealing layers 180 as needed. In some embodiments an adhesive layer may include a primer component to improve adhesion to the electrode layer 110, or a separate primer layer (not shown in FIG. 1 or 2) may be used. (The structures of electrophoretic displays and the component parts, pigments, adhesives, electrode materials, etc., are described in many patents and patent applications published by E ink Corporation, such as U.S. Pat. Nos. 6,922,276; 7,002,728; 7,072,095; 7,116,318; 7,715,088; and 7,839,564, all of which are incorporated by reference herein in their entireties.

Thin-film-transistor (TFT) backplanes usually have only one transistor per pixel electrode or propulsion electrode. Conventionally, each pixel electrode has associated therewith a capacitor electrode such that the pixel electrode and the capacitor electrode form a capacitor; see, for example, International Patent Application WO 01/07961. In some embodiments, N-type semiconductor (e.g., amorphous silicon) may be used to from the transistors and the "select" and "non-select" voltages applied to the gate electrodes can be positive and negative, respectively.

Figure 3:
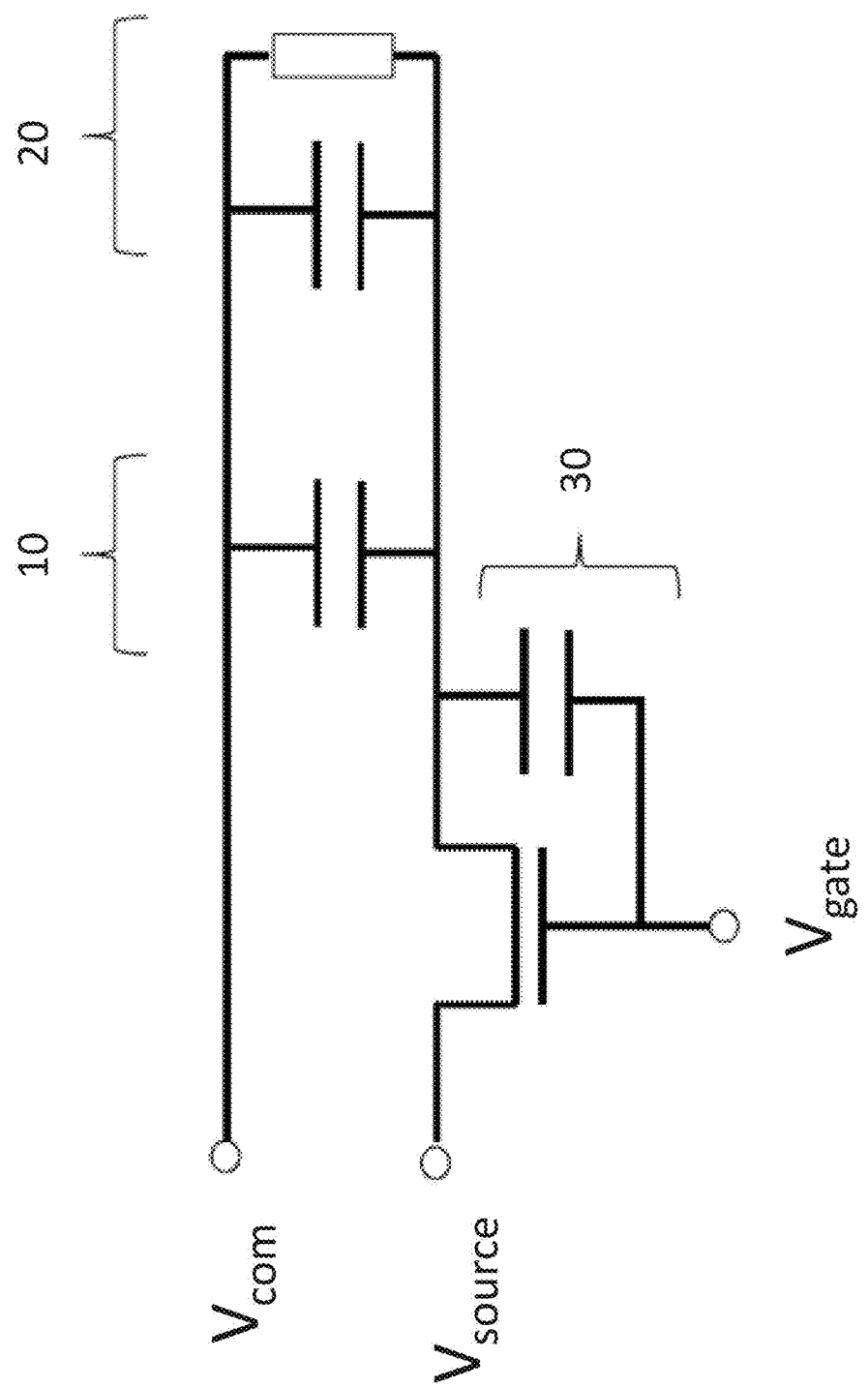
FIG. 3 illustrates an exemplary equivalent circuit of a single pixel of an electrophoretic display wherein the voltage on the single pixel is controlled with a transistor. The circuit of FIG. 3 is commonly used in active matrix backplanes.

As illustrated in in FIG. 3, each transistor (TFT) is connected to a gate line, a data line, and a pixel electrode (propulsion electrode). When there is large enough positive voltage on the TFT gate (or negative depending upon the type of transistor) then there is low impedance between the scan line and pixel electrode coupled to the TFT drain (i.e., Vg "ON" or "OPEN" state), so the voltage on the scan line is transferred to the electrode of the pixel. When there is a negative voltage on the TFT gate, however, then there is high impedance and voltage is stored on the pixel storage capacitor and not affected by the voltage on the scan line as the other pixels are addressed (i.e., Vg "OFF" or "CLOSED"), Thus, ideally, the TFT should act as a digital switch. In practice, there is still a certain amount of resistance when the TFT is in the "ON" setting, so the pixel takes some time to charge. Additionally, voltage can leak from $V_S$ to $V_{pix}$ when the TFT is in the "OFF" setting, causing cross-talk. Increasing the capacitance of the storage capacitor $C_s$ reduces cross-talk, but at the cost of rendering the pixels harder to charge, and increasing the charge time. As shown in FIG. 3, a separate voltage ($V_{TOP}$) is provided to the top electrode, thus establishing an electric field between the top electrode and the pixel electrode ($V_{FPL}$). Ultimately, it is the value of $V_{FPL}$ that determines the optical state of the relevant electro-optic medium. While a first side of the storage capacitor is coupled to the pixel electrode, a second side of the storage capacitor is coupled to a separate line ($V_{COM}$) that allows the charge to be removed from the pixel electrode. See, for example, U.S. Pat. No. 7,176,880, which is incorporated by reference in its entirety. [In some embodiments, N-type semiconductor (e.g., amorphous silicon) may be used to from the transistors and the "select" and "non-select" voltages applied to the gate electrodes can be positive and negative, respectively.] In some embodiments $V_{COM}$ may be grounded, however there are many different designs for draining charge from the charge capacitor, e.g., as described in U.S. Pat. No. 10,037,735, which is incorporated by reference in its entirety.

One problem with conventional amorphous silicon TFTs is that the operating voltage is limited to roughly ±15V, whereupon the transistors start to leak current and ultimately fail. While the operating range of ±15V is suitable for many two-particle electrophoretic systems, it has been found that having increased voltage ranges makes it easier to separate particles with different zeta potentials, resulting in advanced electrophoretic displays that update faster and have more reproducible colors. One solution for increasing the voltage range to a pixel electrode is to use top plane switching, i.e. whereby the voltage on the top (common) electrode is varied as a function of time.

Figure 4:
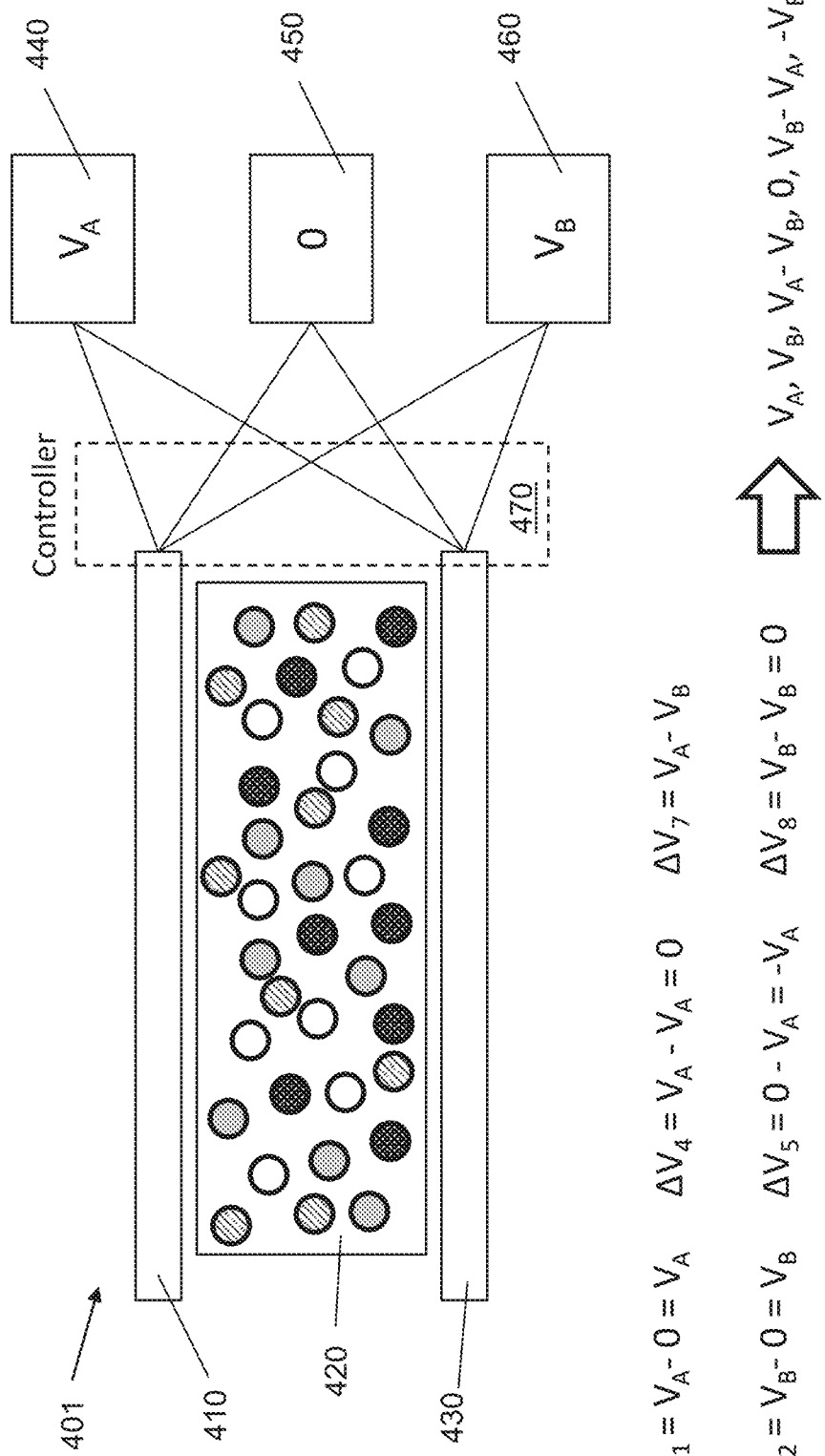
FIG. 4 illustrates how a positive voltage source and a negative voltage source can be applied to a top electrode and two separate drive electrodes to achieve the needed driving voltages at the two separate drive electrodes.

The principle of top plane switching is illustrated in FIG. 4. An exemplary electrophoretic display 401 includes an electrophoretic medium 420 disposed between a top electrode 410 and a (bottom) drive electrode 430. The electrophoretic medium 420 in FIG. 4 is shown with four different types of electrophoretic particles, however the electrophoretic medium 420 can have fewer types of different particles or more types of different particles than shown. In the simplified embodiment of FIG. 4, both the top electrode 410 and the drive electrode 430 are supplied by two different power supplies 440 and 460, which could be from the same power source (not shown). In addition a ground voltage 470 is available. Typically one power supply is positive with respect to ground and one power supply is negative with respect to ground. Which power supply (or ground) is connected to which electrode at a given unit of time (a frame) is controlled by a controller 470. The controller can be a commercial electrophoretic display controller such as manufactured by UltraChip, or it can be a research controller such as offered by E Ink Corporation (HULK Controller, ARC30™ controller) or it can be a virtual controller using, e.g., LABVIEW® to control the output of a voltage board.

As illustrated in the equations below the electrophoretic display 401 of FIG. 4, each combination of voltage provided to the top electrode 410 and the drive electrode 430 results in a voltage differential of $\Delta V = V(\text{Drive Electrode}) - V(\text{Top Electrode})$ on the electrophoretic medium 420. As can be seen by the equations (and as discussed below), by modifying the voltage on the top electrode, a larger dynamic range of voltage on the electrophoretic medium 420 can be achieved. Additionally, where the magnitude of the 440 and 460 are different, intermediate differential voltage values on the electrophoretic medium can be achieved. As shown in FIG. 4, by carefully coordinating when the top electrode 410 and the drive electrode 430 are connected to which power supply, seven different voltages are available to the electrophoretic medium 420.

While FIG. 4 illustrates only a single drive electrode 430, it is understood that the principle can be extended to a system with many drive pixels, such as available with an active matrix backplane. However, coordinating the necessary top electrode voltage to achieve a desired voltage differential across a particular pixel becomes complicated very quickly as the number of pixels increases. In practice, top plane switching with an active matrix backplane uses independent voltage controllers for the top plane and the pixel electrodes, and requires top electrode voltage cycles that last many frames while the individual pixel electrodes are switched to produce the desired waveforms. More details of this method are described in U.S. Pat. No. 10,593,272, which is incorporated by reference in its entirety.

In the instance of ACeP®, each of the eight principal colors (red, green, blue, cyan magenta, yellow, black and white) corresponds to a different arrangement of the four pigments, such that the viewer only sees those colored pigments that are on the viewing side of the white pigment (i.e., the only pigment that scatters light). More specifically, when the cyan, magenta and yellow particles lie below the white particles (Situation [A] in FIG. 5), there are no particles above the white particles and the pixel simply displays a white color. When a single particle is above the white particles, the color of that single particle is displayed, yellow, magenta and cyan in Situations [B], [D] and [F] respectively in FIG. 5. When two particles lie above the white particles, the color displayed is a combination of those of these two particles; in FIG. 5, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 5), all the incoming light is absorbed by the three subtractive primary colored particles and the pixel displays a black color.

It is possible that one subtractive primary color could be rendered by a particle that scatters light, so that the display would comprise two types of light-scattering particle, one of which would be white and another colored. In this case, however, the position of the light-scattering colored particle with respect to the other colored particles overlying the white particle would be important. For example, in rendering the color black (when all three colored particles lie over the white particles) the scattering colored particle cannot lie over the non-scattering colored particles (otherwise they will be partially or completely hidden behind the scattering particle and the color rendered will be that of the scattering colored particle, not black). It would not be easy to render the color black if more than one type of colored particle scattered light.

Figure 6:
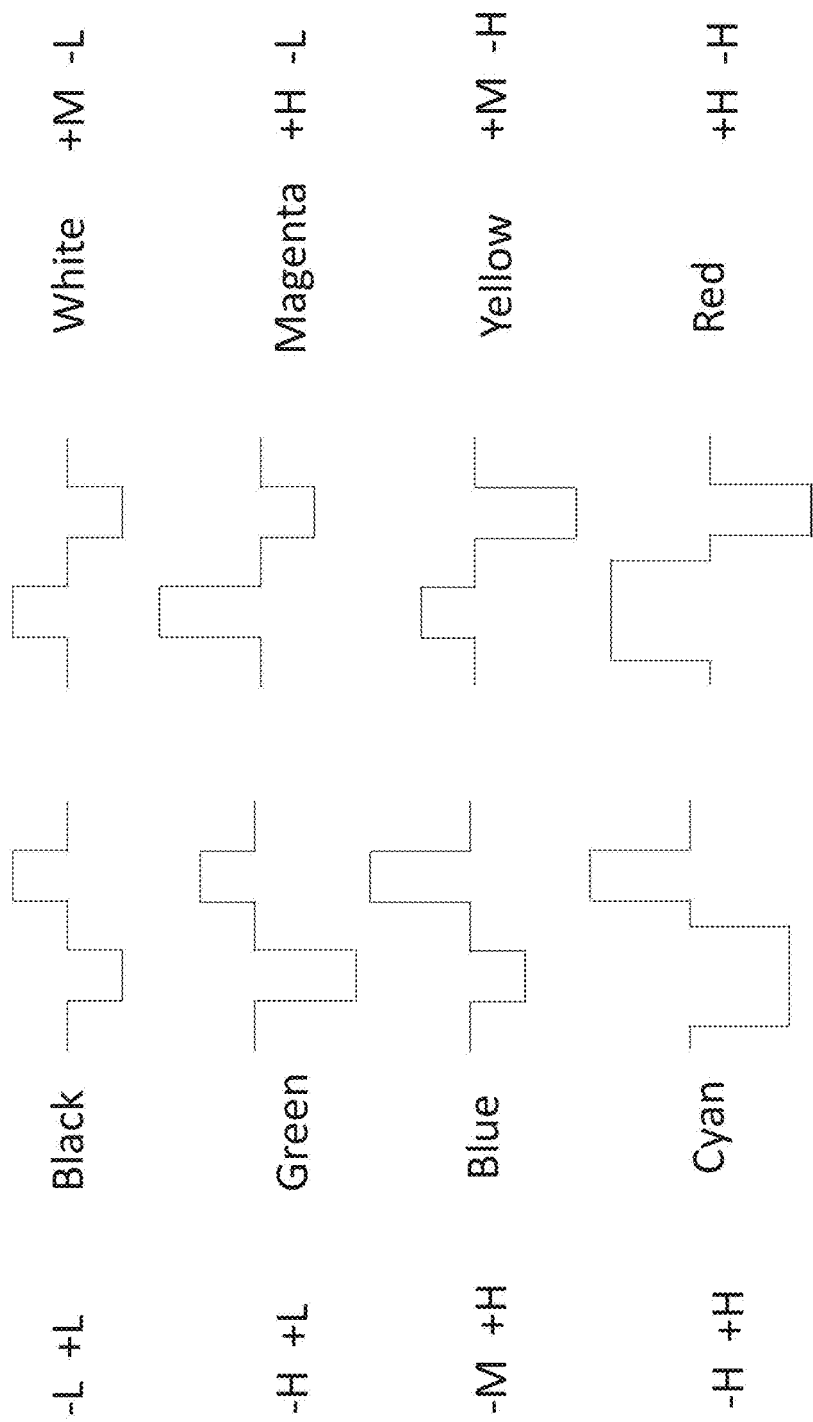
FIG. 6 shows exemplary push-pull drive schemes for addressing an electrophoretic medium including three subtractive particles and a scattering (white) particle.

It has been found that waveforms to sort the four pigments into appropriate configurations to make these colors are best achieved with at least seven voltage levels (high positive, medium positive, low positive, zero, low negative, medium negative, high negative). FIG. 6 shows typical waveforms (in simplified form) used to drive a four-particle color electrophoretic display system described above. Such waveforms have a "push-pull" structure: i.e., they consist of a dipole comprising two pulses of opposite polarity. The magnitudes and lengths of these pulses determine the color obtained. In general, the higher the magnitude of the "high" voltages, the better the color gamut achieved by the display. The "high" voltage is typically between 20V and 30V, more typically around 25V, e.g., 24V The "medium" (M) level is typically between 10V and 20V, more typically around 15V, e.g., 15V or 12V. The "low" (L) level is typically between 3V and 10V, more typically around 7V, e.g., 9V or 5V. Of course, the values for H, M, L will depend somewhat on the composition of the particles, as well as the environment of the electrophoretic medium. In some applications, H, M, L may be set by the cost of the components for producing and controlling these voltage levels.

As shown in FIG. 6, if the top electrode is held at a constant voltage (i.e., not top plane switched), even "simple" waveforms for the ACeP® system require that the driving electronics provide seven different voltages to the data lines during the update of a selected pixel of the display (+H, +M, +L, 0, −L, −M, −H). While multi-level source drivers capable of delivering seven different voltages are available, most commercially-available source drivers for electrophoretic displays permit only three different voltages to be delivered during a single frame (typically a positive voltage, zero, and a negative voltage).

Of course, achieving the desired color with the driving pulses of FIG. 6 is contingent on the particles starting the process from a known state, which is unlikely to be the last color displayed on the pixel. Accordingly, a series of reset pulses precede the driving pulses, which increases the amount of time required to update a pixel from a first color to a second color. The reset pulses are described in greater detail in U.S. Pat. No. 10,593,272, incorporated by reference. The lengths of these pulses (refresh and address) and of any rests (i.e., periods of zero voltage between them may be chosen so that the entire waveform (i.e., the integral of voltage with respect to time over the whole waveform) is DC balanced (i.e., the integral of voltage over time is substantially zero). DC balance can be achieved by adjusting the lengths of the pulses and rests in the reset phase so that the net impulse supplied in the reset phase is equal in magnitude and opposite in sign to the net impulse supplied in the address phase, during which phase the display is switched to a particular desired color.

In addition, the foregoing discussion of the waveforms, and specifically the discussion of DC balance, ignores the question of kickback voltage. In practice, as previously, every backplane voltage is offset from the voltage supplied by the power supply by an amounts equal to the kickback voltage $V_{KB}$. Thus, if the power supply used provides the three voltages +V, 0, and −V, the backplane would actually receive voltages V+$V_{KB}$, $V_{KB}$, and −V+$V_{KB}$ (note that $V_{KB}$, in the case of amorphous silicon TFTs, is usually a negative number). The same power supply would, however, supply +V, 0, and −V to the front electrode without any kickback voltage offset. Therefore, for example, when the front electrode is supplied with −V the display would experience a maximum voltage of 2V+$V_{KB}$ and a minimum of $V_{KB}$. Instead of using a separate power supply to supply $V_{KB}$ to the front electrode, which can be costly and inconvenient, a waveform may be divided into sections where the front electrode is supplied with a positive voltage, a negative voltage, and $V_{KB}$. In addition to the kickback Higher Voltage Addressing with Metal Oxide Backplanes While modifying the rail voltages provides some flexibility in achieving differing electro-optical performance from a four-particle electrophoretic system, there are many limitations introduced by top-plane switching. For example, it is typically preferred, in order to make a white state with displays of the present invention, that the lower negative voltage $V_{M-}$ is less than half the maximum negative voltage $V_{H-}$. As shown in the equations above, however, top-plane switching requires that the lower positive voltage is always at least half the maximum positive voltage, typically more than half.

An alternative solution to the complications of top-plane switching can be provided by fabricating the control transistors from less-common materials that have a higher electron mobility, thereby allowing the transistors to switch larger control voltages, for example +/−30V, directly. Newly-developed active matrix backplanes may include thin film transistors incorporating metal oxide materials, such as tungsten oxide, tin oxide, indium oxide, and zinc oxide. In these applications, a channel formation region is formed for each transistor using such metal oxide materials, allowing faster switching of higher voltages. Such transistors typically include a gate electrode, a gate-insulating film (typically $SiO_2$), a metal source electrode, a metal drain electrode, and a metal oxide semiconductor film over the gate-insulating film, at least partially overlapping the gate electrode, source electrode, and drain electrode. Such backplanes are available from manufacturers such as Sharp/Foxconn, LG, and BOE.

One preferred metal oxide material for such applications is indium gallium zinc oxide (IGZO). IGZO-TFT has 20-50 times the electron mobility of amorphous silicon. By using IGZO TFTs in an active matrix backplane, it is possible to provide voltages of greater than 30V via a suitable display driver. Furthermore, a source driver capable of supplying at least five, and preferably seven levels provides a different driving paradigm for a four-particle electrophoretic display system. In an embodiment, there will be two positive voltages, two negative voltages, and zero volts. In another embodiment, there will be three positive voltages, three negative voltages, and zero volts. In an embodiment, there will be four positive voltages, four negative voltages, and zero volts. These levels may be chosen within the range of about −27V to +27V, without the limitations imposed by top plane switching as described above.

Using advanced backplanes, such as metal oxide backplanes, it is possible to directly address each pixel with a suitable push-pull waveform, i.e., as described in FIG. 6. This greatly reduces the time required to update each pixel, in some instances transforming a six-second update to less than one second. While, in some cases, it may be necessary to use reset pulses to establish a starting point for addressing, the reset can be done quicker at higher voltages. Additionally, in four-color electrophoretic displays having reduced color sets, it is possible to directly drive from a first color to a second color with a specific waveform that is only slightly longer than the push-pull waveforms shown in FIG. 6.

Simplified Top-Plane Switching

To reduce the length of time and flashiness of an update, the complexity of the front-plane switching can be reduced in exchange for a smaller number of available colors. Additionally, because the particles have a finite speed within the electrophoretic medium, the amount of time for which the dipole is applied also influences the size of the color gamut.

Figure 7:
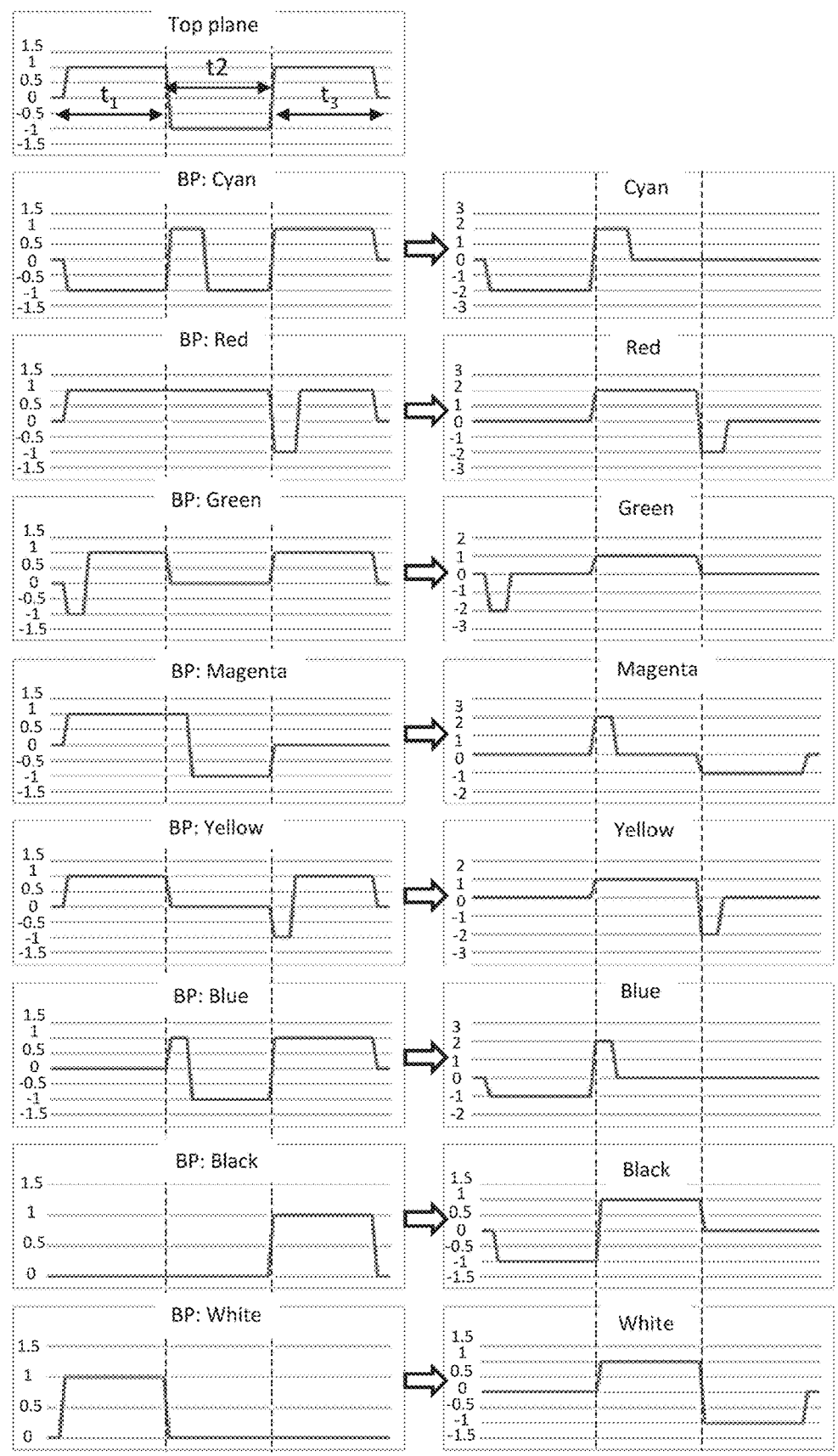
FIG. 7 depicts simplified top plane driving waveforms for the production of eight colors in an electrophoretic medium including three subtractive particles and a scattering (white) particle.

FIG. 7 shows such a solution in which a simplified top plane switching pulse sequence is used (top left panel), with simplified backplane pulse sequences (left; below) being matched to the single top-plane sequence, thereby providing at least distinct colors. The top plane is switched between two voltages, one positive and one negative, while the back plane can take three different voltages: positive, negative, and zero. (In FIG. 7, the voltage levels are relative, i.e., 1, 0, −1, but would in many instances actually be 15V, 0, and −15V as is typically with commercial backplanes including amorphous silicon thin film transistors.) Note that by subtracting the pulse sequence of the top-plane from the backplane pulse sequence (FIG. 7 left), the eight color sequences in FIG. 6 are achieved (FIG. 7 right). It is understood that for the pulse sequences in FIG. 6 and FIG. 7, the electrophoretic fluid includes a white pigment that is negatively charged, a magenta pigment and a cyan pigment that are positively charged, and the yellow pigment may be either positively or negatively charged, or essentially neutral. Other color/charge combinations are possible and the waveforms can be adjusted accordingly.

As discussed previously, in the waveforms of FIG. 7 at least five different voltages are required. In an active matrix driving environment, this may be achieved either (a) by supplying a choice of five different voltages to the columns when a particular row is selected at a particular time, or (b) by providing a choice of fewer (say, three) different voltages to the columns when a particular row is selected at a first time, and a different set of voltages when the same row is selected at a second time, or (c) by providing the same choice of three voltages to the columns at both the first and second times, but changing the potential of the front electrode between the first and second times. Option (c) is particularly helpful when at least one of the voltages required to be supplied is higher than the backplane electronics can support.

Because, with top plane switching, it is not possible to assert a high positive and a high negative potential simultaneously, it is necessary to offset the +/− dipoles of the top plane with respect to the −/+ dipoles of the backplane. In the waveform shown in FIG. 7, there is only one dipole per transition. This provides the least "flashy" waveform possible, since each dipole results in two visible optical changes to the display. In cases where five different voltage levels can be supplied to the backplane electrodes when each row is selected, and where the backplane electronics can support the highest voltages needed, it is not necessary to offset the dipoles in the manner shown in FIG. 7.

Driving with Cycled Top Plane Voltage

For the drive sequences of FIG. 7, the voltages applied to the top plane are denoted $V_{t+}$ and $V_{t-}$, respectively, and those applied to the back plane $V_{b+}$ and $V_{b-}$, respectively, and $|V_{t+}|=|V_{t-}|=|V_{b+}|=|B_{b-}|=V$. Accordingly, when the maximum supply voltage is +/−15 volts, as is typical with commercial backplanes, the voltages across the electrophoretic medium become 30V, 28V, 0V, −28V, and −30V.

The maximum voltage magnitudes (i.e., "rail") of the top-plane electrode and the back-plane electrode need not be the same, however. For example, rail voltages offsets can be calculated from some nominal maximum voltage magnitude value, V. The offset for each rail may be denoted w, x, y and z, while it is assumed that the zero voltage rail is kept at zero and not applied to the top plane.
Thus:

$$V_{t+}=V+w$$

$$V_{t-}=-V+x$$

$$V_{t0}=0$$

$$V_{b+}=V+y$$

$$V_{b-}=-V+z$$

$$V_{b0}=0$$

Referenced to the backplane voltage, three different negative voltages of high, medium and low magnitudes may be applied to the electrophoretic medium when the top plane is set to $V_{t+}$, denoted as $V_{H-}$, $V_{M-}$, and $V_{L-}$, (i.e., $V_b-V_t$, where $V_b$ can take any of the three values shown above).
These voltages are:

$$V_{H-}=-2V+z-w$$

$$V_{M-}=-V-w$$

$$V_{L-}=y-w$$

The voltages available when the top plane is set to $V_{t-}$ are:

$$V_{H+}=2V+y-x$$

$$V_{M+}=V-x$$

$$V_{L+}=z-x$$

The voltages available when the top plane is set to 0 are:

$$V_{H0}=V+y$$

$$V_{M0}=0$$

$$V_{L0}=-V+z$$

It is apparent that when w=y and x=z it is possible to maintain the zero voltage condition whether the top plane is set to $V_{t+}$, $V_{t-}$, or zero. In practice, waveforms require significantly greater complexity and length if optimum colors are to be obtained. Accordingly, the top plane switching pattern require thus be significantly more complex the one illustrated in FIG. 7. A difficulty arises, however, in applications requiring simultaneous updates in different regions of a display with staggered start times separated by less than the length of one waveform. Because the top plane potential is asserted over the entire display it may be impossible to initiate a new update in one region of the display before the end of a previously-initiated update in another location.

Figure 8:
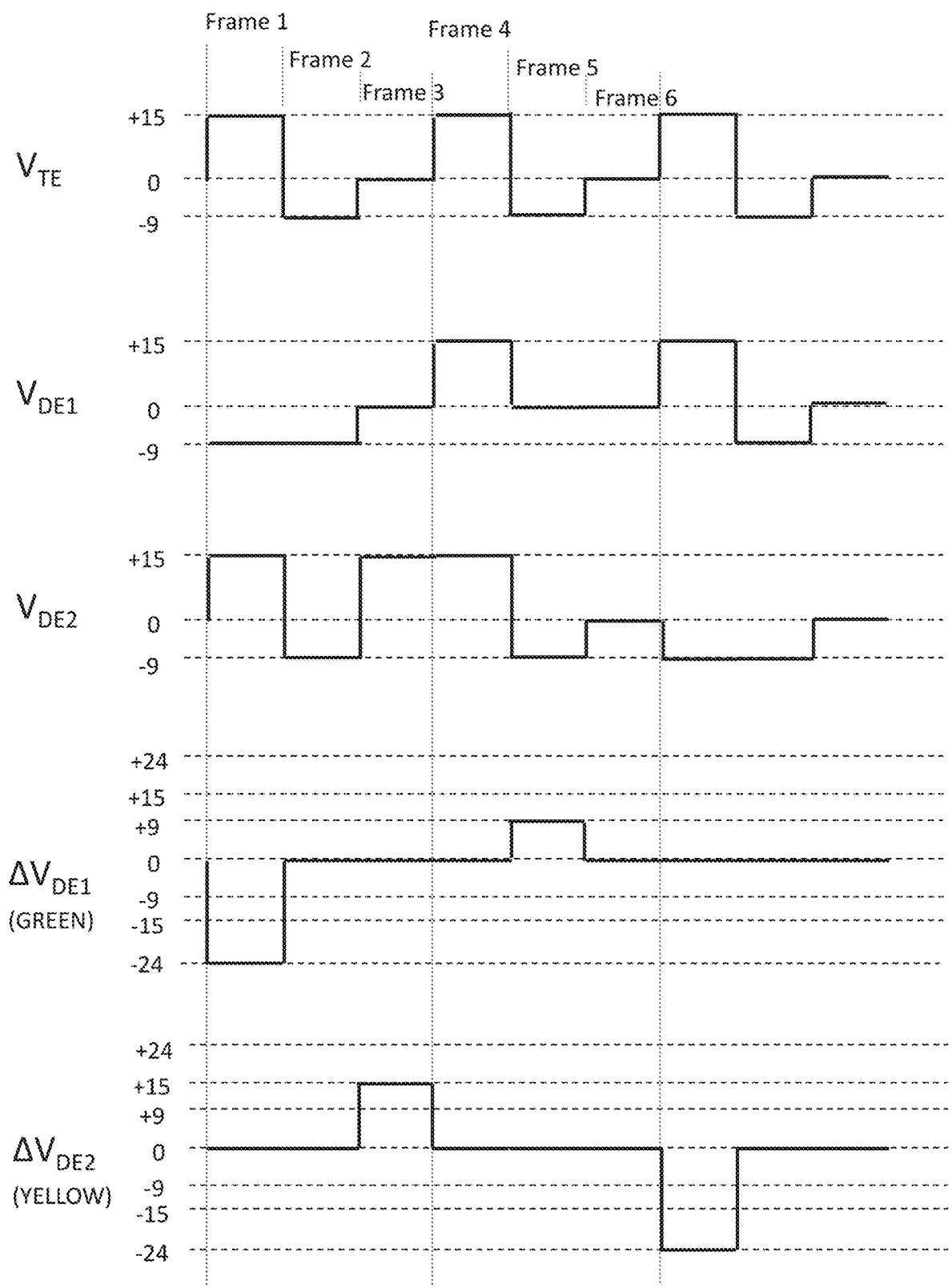
FIG. 8 shows an exemplary drive pattern to achieve a green optical state at the viewing surface above a first drive electrode and a yellow optical state at the viewing surface above a second drive electrode using only two voltage sources.

The problem of coordinating multiple simultaneous updates each requiring top plane switching can be solved by cycling the top plane voltage while stretching out the waveform, as illustrated in FIG. 8. ($V_{TE}$=top electrode voltage, $V_{DE1}$=first drive electrode voltage, $V_{DE2}$=second drive electrode voltage, $\Delta V_{DE1}$=voltage differential on electrophoretic medium between first drive electrode and top electrode, $\Delta V_{DE2}$=voltage differential on electrophoretic medium between second drive electrode and top electrode.)

A green waveform and a yellow waveform, previously created for a seven-level backplane capable of providing +/−24V, +/−15V, +/−9V or 0V at any pixel location in any frame, was modified for cycled top plane driving. A controller provides successive frames of +15V, −9V and 0V (i.e., V=15V, w=y=0V and x=z=6V in the above equations) to the top electrode, as shown in FIG. 9. By stretching out the waveform, and coordinating the voltage to the first and second drive electrodes with the top electrode cycle, it was possible to effect simultaneous color updates at two different drive electrodes using top-plane switching.

When the top electrode is at +15V the voltage differential available to the electrophoretic medium is −24V, −15V, −0V. When the top electrode is at −9V, the voltage differential available to the electrophoretic medium is 24V 9V and 0V. When the top electrode is at ground (0V), the voltage differential available to the electrophoretic medium is 15V, 0V and −9V in the third. [By convention, the voltage differential is $\Delta V=V(Drive\ Electrode)-V(Top\ Electrode)$.] Thus, 7 voltage levels were available: +/−24V, +/−15V and +/−9V plus 0V. It should be noted that when a particular drive electrode needs to "wait" for the next top electrode frame, that drive electrode is set to the same voltage as the top electrode so that the voltage differential across the electrophoretic medium is zero for that frame. Obviously, this makes the waveforms longer in time, and each "simple" waveform now requires three times longer updates than the original multilevel waveform.

Using a model of a four-particle electrophoretic system, the top electrode cycled driving with +15V, −9V, and 0 was tested against the same system having seven individual drive levels and a static top electrode. The results are shown in Tables 1 and 2, below, and represented in the graph of FIG. 9A and the simulated color table of FIG. 9B.

TABLE 1

Calculated L*a*b* values for modded ACeP system using dedicated seven-level driver.

| color | L* | a* | b* | Color |
|---|---|---|---|---|
| Black | 20.4 | 0.3 | −17.5 | Black |
| Blue | 37.3 | −0.4 | −22.3 | Blue |
| Red | 49.4 | 18 | 8 | Red |
| Magenta | 39.5 | 28.5 | −11.3 | Magenta |
| Green | 52.9 | −14.5 | 11.6 | Green |
| Cyan | 44.9 | −12.7 | −9.2 | Cyan |
| Yellow | 64.5 | −8.6 | 36.1 | Yellow |
| White | 67.2 | −6.7 | 15.2 | White |
| | | | Gamut | 14565 |
| | | | CR | 11.9 |

TABLE 2

Calculated L*a*b* values for modeled ACeP system using top electrode cycling and +15 V and −9 V power supply.

| color | L* | a* | b* | Color |
|---|---|---|---|---|
| Black | 18.1 | −2.5 | −6.6 | Black |
| Blue | 30.5 | −12.7 | −15.8 | Blue |
| Red | 48.5 | 10.9 | 14.6 | Red |
| Magenta | 38 | 26.3 | −7.7 | Magenta |
| Green | 46 | −21.4 | 7.9 | Green |
| Cyan | 35 | −18 | −13.6 | Cyan |
| Yellow | 59.7 | −8.9 | 27.9 | Yellow |
| White | 61.7 | −2.8 | 1.7 | White |
| | | | Gamut | 15991 |
| | | | CR | 11.8 |

Figure 9A:
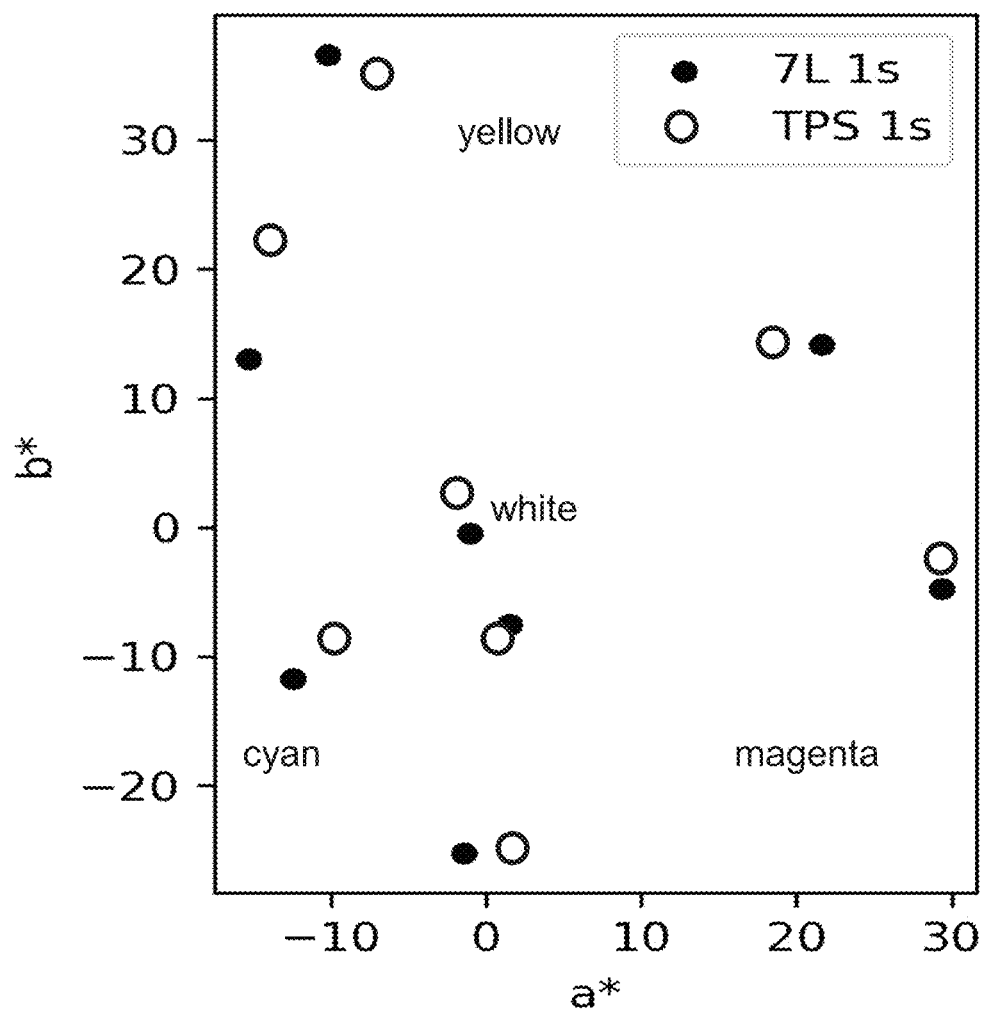
FIG. 9A shows the change in L*a*b* values of the eight color indices when the same four particle electrophoretic medium is driven with seven independent drive voltages or with two voltage sources and using coordinated top electrode voltage cycling.
Figure 9B:
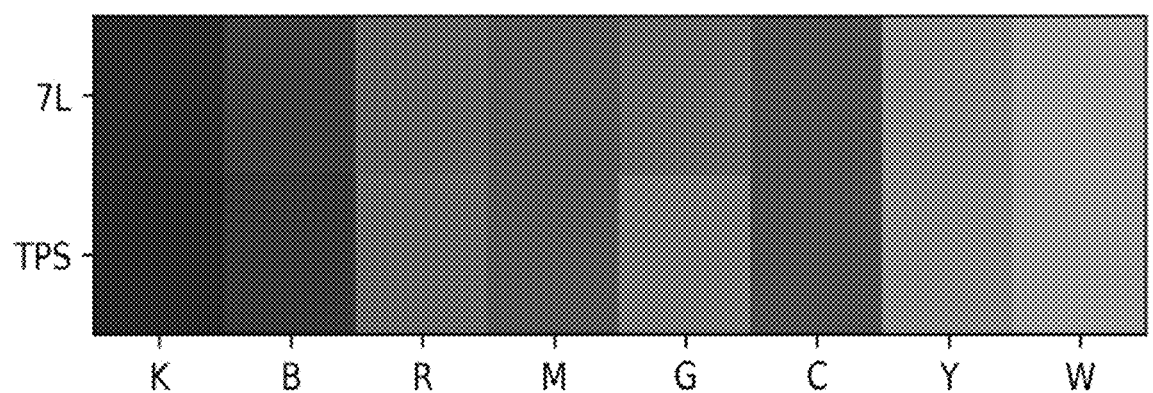
FIG. 9B shows the date in the graph of FIG. 9A as simulated colors.

Comparing Tables 1 and 2, it seems that there is little penalty for the top electrode cycling beyond the longer update times. In fact the color gamut (color space) is actually slightly larger for the top electrode cycling method. The differences between the two methods can be further visualized by considering FIGS. 9A and 9B. In FIGS. 9A, the filled circles represent the L*a*b* measurement of the seven-level driver, whereas the open circles represent the L*a*b* measurement of the cycled top electrode driving. As can be seen from FIGS. 9A and 9B, the resulting primary color states are quite similar. (Compare positions of open circles to filled circles.) The greatest change is seen in the green primary (left center of FIG. 9A) where the green primary drifts quite a bit toward the yellow. The difference in color states for the green primary is also evident in FIG. 9B.

Thus, the invention provides for full color electrophoretic displays that are capable of directly addressing the electrophoretic medium with and without top plane switching, as well as waveforms for such electrophoretic displays. Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. A system for driving an electrophoretic medium, comprising:
    an electrophoretic display including,
        a light-transmissive top electrode at a viewing surface,
        a first drive electrode,
        a second drive electrode,
        an electrophoretic medium disposed between the top electrode and the first and second drive electrodes;
    a power source capable of providing a positive voltage and a negative voltage, where the magnitude of the positive voltage and the negative voltage are different;
    a controller coupled to the top electrode driver, the first drive electrode driver, and the second drive electrode driver, the controller configured to provide:
        in a first frame, the positive voltage to the top electrode, the negative voltage to the first drive electrode, and the positive voltage to the second drive electrode,
        in a second frame, the negative voltage to the top electrode, the negative voltage to the first drive electrode, and the negative voltage to the second drive electrode,
        in a third frame, the ground voltage to the top electrode, the ground voltage to the first drive electrode, and the positive voltage to the second drive electrode, and
        in a fourth frame, the positive voltage to the top electrode, the positive voltage to the first drive electrode, and the positive voltage to the second drive electrode.

2. The system of claim 1, wherein the controller is configured to further provide:
    in a fifth frame, the negative voltage to the top electrode, the ground voltage to the first drive electrode, and the negative voltage to the second drive electrode, and
    in a sixth frame, the ground voltage to the top electrode, the ground voltage to the first drive electrode, and the ground voltage to the second drive electrode.

3. The system of claim 1, wherein the electrophoretic medium is encapsulated in a plurality of microcapsules and the microcapsules are dispersed in a polymer binder between the top electrode and the first and second drive electrodes.

4. The system of claim 1, wherein the electrophoretic medium is encapsulated in an array of microcells having openings wherein the opening are sealed with a polymer binder, and the array of microcells is disposed between the top electrode and the first and second drive electrodes.

5. The system of claim 1, wherein the electrophoretic medium comprises a non-polar fluid and four sets of particles having different optical properties.

6. The system of claim 5, wherein the first and second sets of particles bear charges of opposite polarity, the third and fourth sets of particles bear charges of opposite polarity, the first particle is a light-scattering particle, and the second, third, and fourth sets of particles are each a subtractive primary color different from each other.

7. The system of claim 6, wherein the controller is configured to provide combinations of the positive voltage, the negative voltage, and the ground voltage to the top electrode and the first drive electrode such that the colors white, yellow, red, magenta, blue, cyan, green, and black can be displayed at the viewing surface.

8. The system of claim 5, wherein the first and second sets of particles bear charges of opposite polarity, the third and fourth sets of particles bear the same charge as the second particle, the first particle is a light-scattering particle, and the second, third, and fourth sets of particles are each a subtractive primary color different from each other.

9. The system of claim 8, wherein the controller is configured to provide combinations of the positive voltage, the negative voltage, and the ground voltage to the top electrode and the first drive electrode such that the colors white, yellow, red, magenta, blue, cyan, green, and black can be displayed at the viewing surface.

10. The system of claim 1, wherein the positive voltage is +15V and the negative voltage is −9V.

11. The system of claim 1, wherein the positive voltage is +9V and the negative voltage is −15V.

12. A system for driving an electrophoretic medium, comprising:
    an electrophoretic display including,
        a light-transmissive top electrode at a viewing surface,
        a first drive electrode,
        a second drive electrode,
        an electrophoretic medium disposed between the top electrode and the first and second drive electrodes;
    a power source capable of providing a positive voltage and a negative voltage, where the magnitude of the positive voltage and the negative voltage are different;

a controller coupled to the top electrode driver, the first drive electrode driver, and the second drive electrode driver, the controller configured to provide:
- in a first frame, the positive voltage to the top electrode, the negative voltage to the first drive electrode, and the positive voltage to the second drive electrode,
- in a second frame, the negative voltage to the top electrode, the negative voltage to the first drive electrode, and the negative voltage to the second drive electrode,
- in a third frame, the ground voltage to the top electrode, the ground voltage to the first drive electrode, and the ground voltage to the second drive electrode, and
- in a fourth frame, the positive voltage to the top electrode, the positive voltage to the first drive electrode, and the positive voltage to the second drive electrode.

13. The system of claim 12, wherein the controller is configured to further provide:
- in a fifth frame, the negative voltage to the top electrode, the ground voltage to the first drive electrode, and the negative voltage to the second drive electrode, and
- in a sixth frame, the ground voltage to the top electrode, the ground voltage to the first drive electrode, and the ground voltage to the second drive electrode.

14. The system of claim 12, wherein the electrophoretic medium is encapsulated in a plurality of microcapsules and the microcapsules are dispersed in a polymer binder between the top electrode and the first and second drive electrodes.

15. The system of claim 12, wherein the electrophoretic medium is encapsulated in an array of microcells having openings wherein the opening are sealed with a polymer binder, and the array of microcells is disposed between the top electrode and the first and second drive electrodes.

16. The system of claim 12, wherein the electrophoretic medium comprises a non-polar fluid and four sets of particles having different optical properties.

17. The system of claim 16, wherein the first and second sets of particles bear charges of opposite polarity, the third and fourth sets of particles bear charges of opposite polarity, the first particle is a light-scattering particle, and the second, third, and fourth sets of particles are each a subtractive primary color different from each other.

18. The system of claim 17, wherein the controller is configured to provide combinations of the positive voltage, the negative voltage, and the ground voltage to the top electrode and the first drive electrode such that the colors white, yellow, red, magenta, blue, cyan, green, and black can be displayed at the viewing surface.

19. The system of claim 16, wherein the first and second sets of particles bear charges of opposite polarity, the third and fourth sets of particles bear the same charge as the second particle, the first particle is a light-scattering particle, and the second, third, and fourth sets of particles are each a subtractive primary color different from each other.

20. The system of claim 19, wherein the controller is configured to provide combinations of the positive voltage, the negative voltage, and the ground voltage to the top electrode and the first drive electrode such that the colors white, yellow, red, magenta, blue, cyan, green, and black can be displayed at the viewing surface.

* * * * *